UNITED STATES PATENT OFFICE.

GEO. E. VAN DERBURGH, OF NEW YORK, N. Y.

IMPROVED ARTIFICIAL BUILDING-BLOCK.

Specification forming part of Letters Patent No. 48,744, dated July 11, 1865.

*To all whom it may concern:*

Be it known that I, GEORGE E. VAN DERBURGH, of New York city, in the county and State of New York, have invented a new and useful Building-Block as a Substitute for Bricks and Stones; and I do hereby declare that the following is a full, clear, and exact description thereof.

The bases of this improved block are lime and sand, or lime and pulverized or disintegrated marble, granite, or other rocks, as an equivalent for sand. These old and well-known materials for building purposes have been used in combination in a great variety of relative proportions under innumerable forms, either as mortar to cement stones or bricks together, as concrete to make foundations, or as molded and dried blocks of mortar; but in my present invention these old and well known materials are so combined as to form a new block for building purposes possessing new properties and advantages essentially different from those possessed by any other known artificial building material.

The manner in which these new building-blocks are formed is as follows: A quantity of silicious sand, (or, as its equivalent, disintegrated marble or other stone, or even scoria,) which must be as free as possible from admixture with clay or other earths, is provided, together with a quantity of good quicklime in a finely-powdered state. These two ingredients—clean, sharp sand or its equivalent and good quicklime—are then thoroughly mixed together in the proportions of about one part, by measure, of lime to ten or twelve parts of sand, the sand being as damp as it ordinarily is when dug out of the earth. The lime, becoming slaked in contact with the damp sand, absorbs and expels all the moisture, and in the form of an impalpable powder coats effectually each one of the silicious particles of the mass, so as to produce when again moistened or dampened much firmer, stronger cohesion between the particles of the mass than by any other known process. The composition when thus again dampened is placed in molds of the proper shape, and submitted to great pressure in a suitable press. The pressure should in all cases be proportioned to the thickness of the block required, thinner blocks requiring, of course, less pressure than those which are thicker. When the block has been thus submitted to pressure it is removed from the mold with care and exposed to the air, where it should remain until sufficiently hardened or ripened to be built into a wall. The blocks thus made become so indurated after a few months' exposure to the atmosphere as not to be readily distinguishable from natural sandstone.

An excess of moisture to such a degree as that it would exude from the block when under pressure should be carefully avoided in dampening the mixture of lime and sand, as the water, if not entirely expressed from the blocks, would by subsequent evaporation leave them comparatively porous, light, and friable, and not only liable to crack and warp, but also prevent them from attaining that degree of induration which is desired therein.

The proportion of lime and sand must necessarily vary somewhat in view of the difference which exists in the various qualities of the lime and the nature of the sand, whether coarse or fine, but the average proportions are as heretofore given—one of lime to twelve of sand.

Oxides of metals or other coloring-matter may be used to give any desirable color to the blocks, and they may evidently be molded into any ornamental forms.

I am aware that building-blocks have been made in the manner herein described, by the admixture of slaked lime with sand, under substantially the same conditions as are hereinbefore named, but I have discovered that by the use of quicklime in the construction of artificial stone or building-blocks, as described, I obtain far better results and a much more durable stone; and,

Having now fully described my invention, I claim—

As a new article of manufacture, blocks of artificial stone formed substantially in the manner herein set forth.

G. E. VAN DERBURGH.

Witnesses:
 JNO. T. SNOOK,
 GEO. A. MAYHAM.